United States Patent [19]

Bittner

[11] Patent Number: 5,541,696
[45] Date of Patent: Jul. 30, 1996

[54] CAMERA LENS COVER AND HOOD ASSEMBLY

[75] Inventor: Wilfried A. A. Bittner, Hong Kong, Hong Kong

[73] Assignee: W. Haking Enterprises Limited, Hong Kong

[21] Appl. No.: 530,753

[22] Filed: Sep. 19, 1995

[30] Foreign Application Priority Data

Sep. 21, 1994 [GB] United Kingdom .................... 9419057

[51] Int. Cl.$^6$ .................................................. G03B 17/02
[52] U.S. Cl. ........................................... 354/288; 359/612
[58] Field of Search ................................. 354/286–288, 354/187, 202; 359/511, 611, 612

[56] References Cited

U.S. PATENT DOCUMENTS

| | | | |
|---|---|---|---|
| 4,045,117 | 8/1977 | Lerner | 354/287 X |
| 4,415,242 | 11/1983 | Major | 359/612 |
| 4,457,604 | 7/1984 | Tsuboi | 354/202 X |
| 5,294,954 | 3/1994 | Nomura et al. | 354/287 |
| 5,461,441 | 10/1995 | Kotani | 354/187 |

*Primary Examiner*—D. Rutledge
*Attorney, Agent, or Firm*—Mason, Kolehmainen, Rathburn & Wyss

[57] ABSTRACT

A compact camera includes lens cover doors movable between closed standby positions and open operating positions. A lens hood is movable between a retracted standby position and an extended operating position. The hood prevents extraneous light from entering the camera and the doors protect the lens. The doors and hood are coupled by a cam system so they move simultaneously. Springs urge the doors and hood toward their operating positions, and a latch system retains the doors and hood in their standby positions. In the operating position, the doors are nested within and protected by the hood.

11 Claims, 6 Drawing Sheets

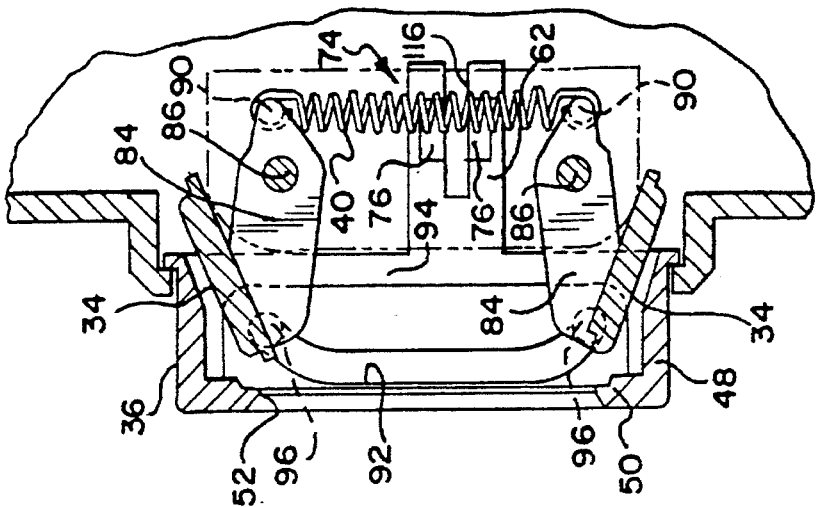
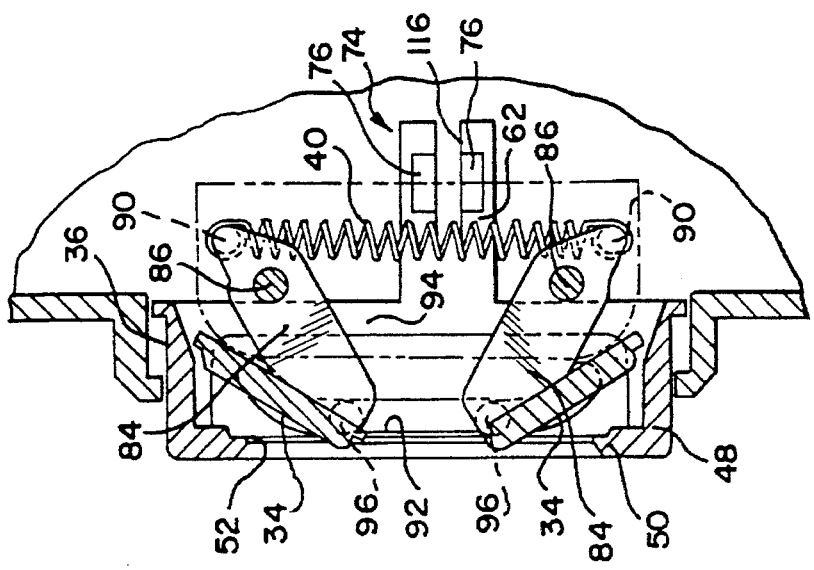
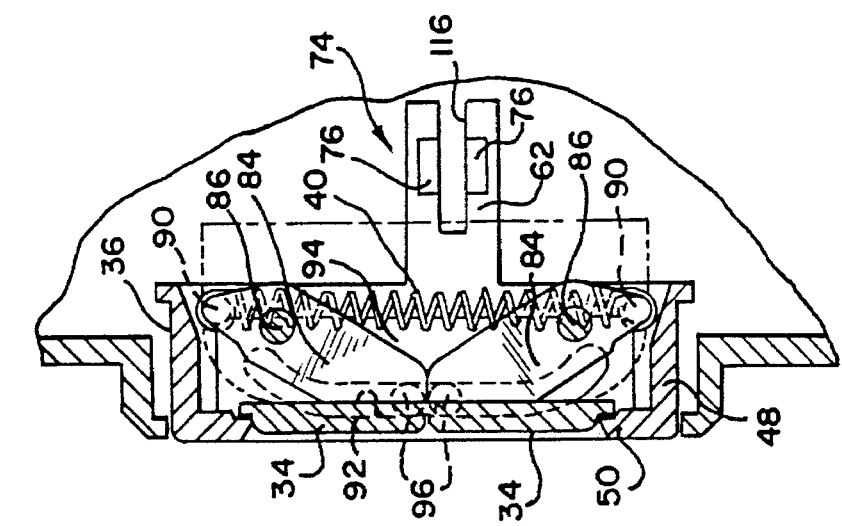

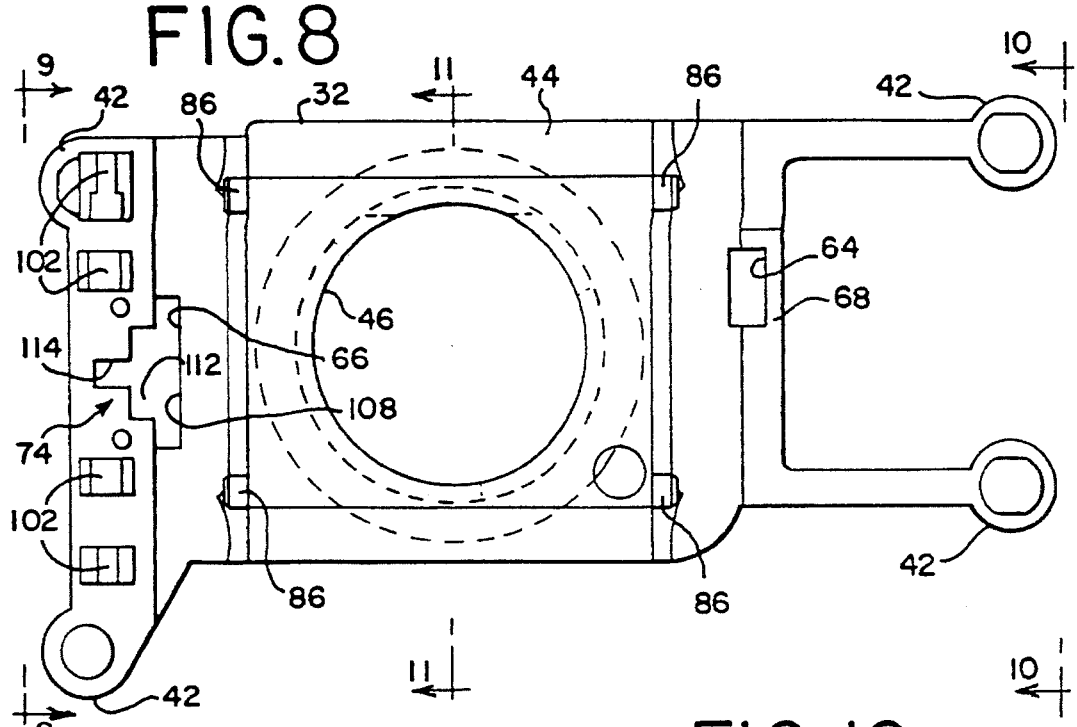
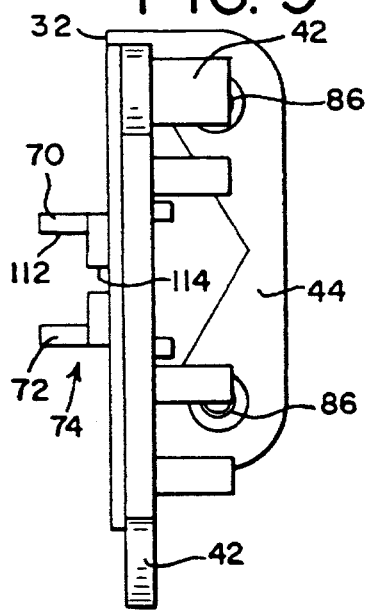
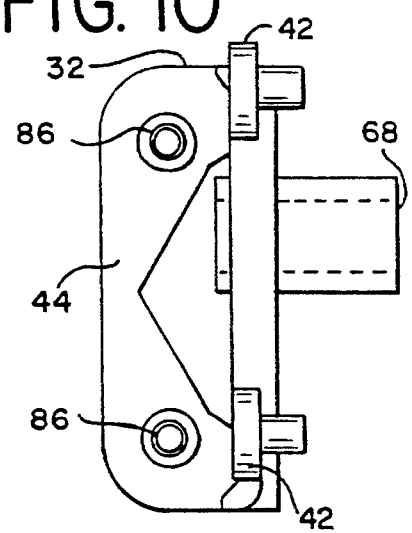
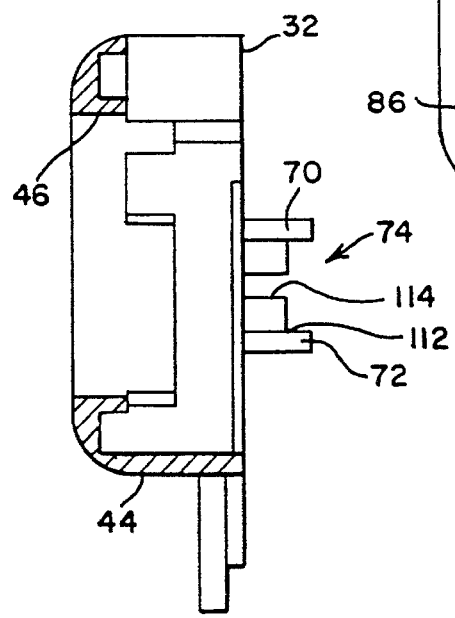

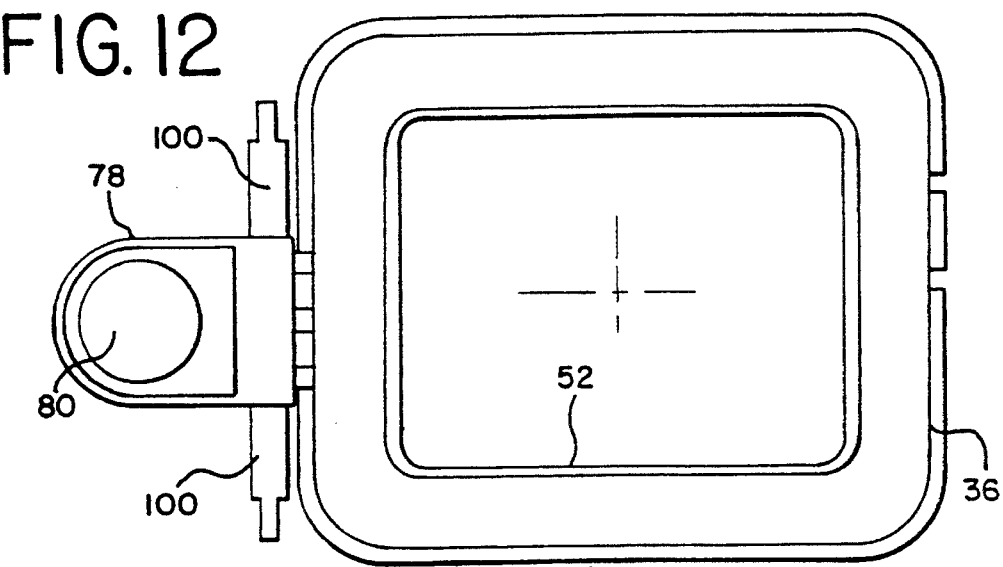
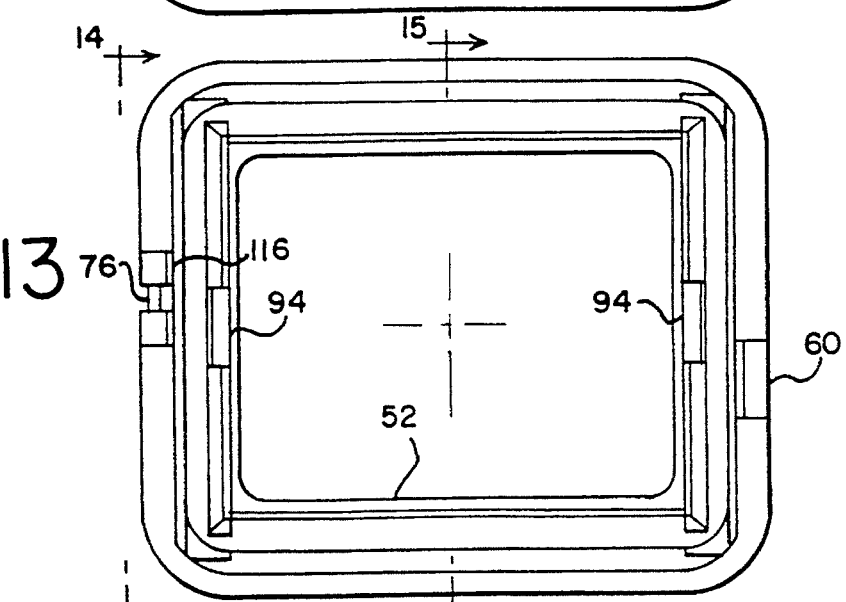
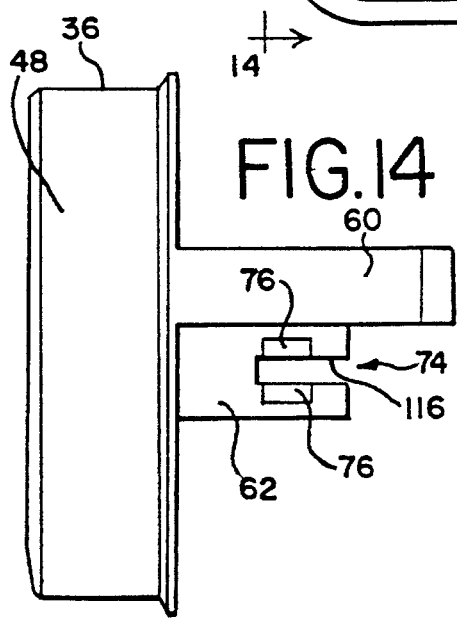
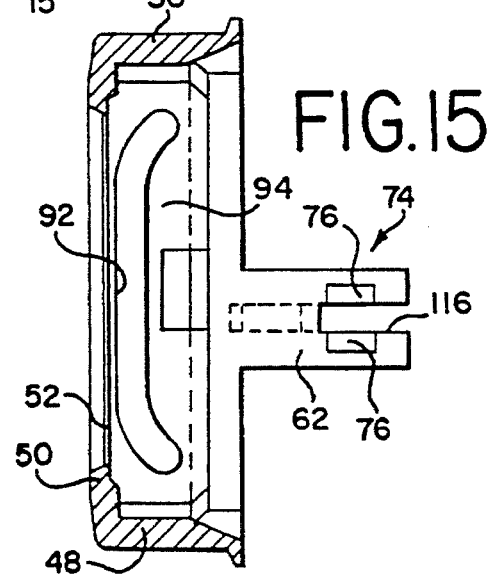

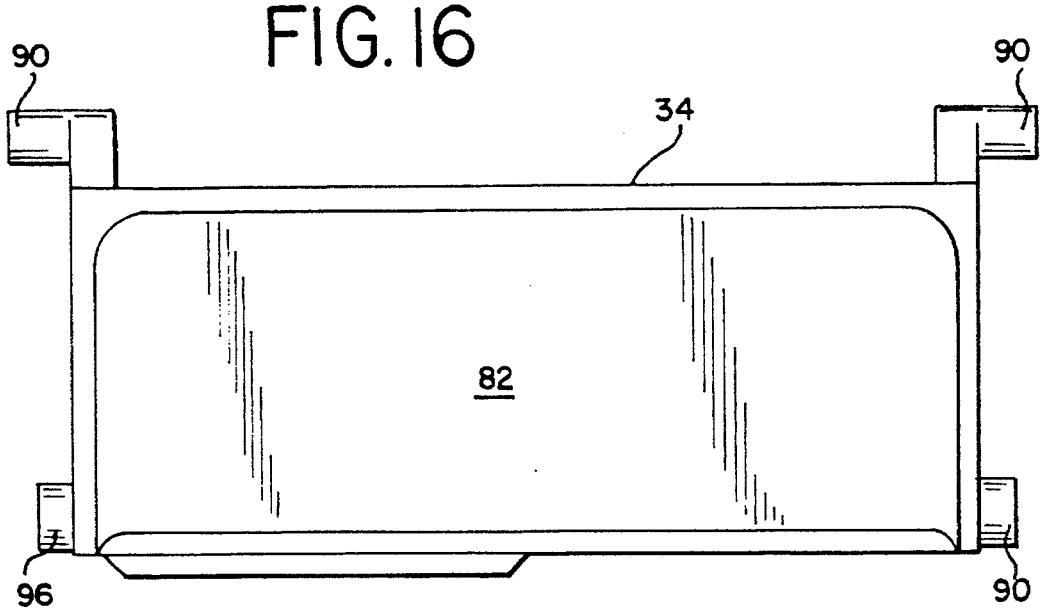
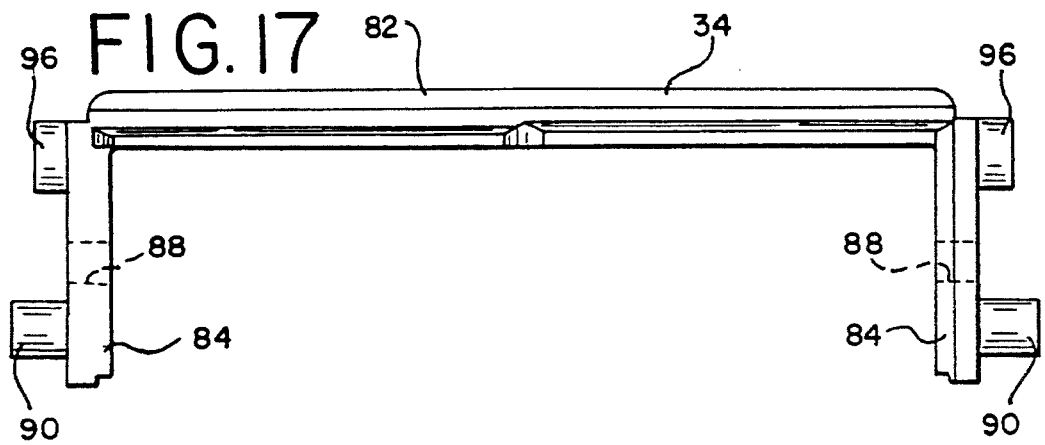
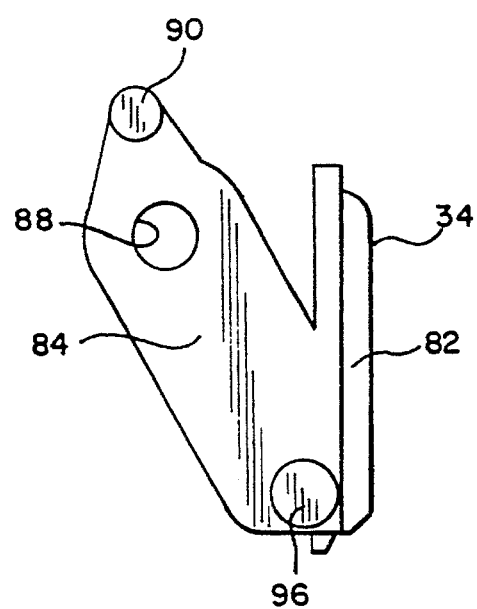

CAMERA LENS COVER AND HOOD ASSEMBLY

FIELD OF THE INVENTION

The present invention relates to cameras, and more particularly to an improved lens cover and hood assembly for compact cameras.

DESCRIPTION OF THE PRIOR ART

In the design of small cameras such as compact thirty-five millimeter cameras, it is desirable to reduce the front to back thickness of the camera as much as possible. As a result, the camera lens is located close to the front surface of the camera. In this relatively exposed position, the lens may be dirtied or may be subject to damage such as scratching or the like unless protected by a cover when not in use. In addition, a lens located near the front of the camera can admit light from a strong light source outside of the field of view to the camera interior, resulting in a flaring or veiling glare of the exposed film.

A lens hood can be used to assure that only light from within the field of view enters the lens. If the lens is hooded by retracting the lens within the camera or by a fixed or detachable lens hood on the front of the camera, the advantage of compactness is lost.

Although manually extendible lens hoods have been employed on some lens units, if this approach were used on a compact camera, the necessity for manipulation of the hood before using the camera would be a disadvantage.

In the past various different types of lens covers have been employed to overcome the problems of lens damage and dirt. The simplest is a simple cover member that is manually attached and removed. In order to avoid the inconvenience of manual handling, automatic lens covers have been used. In one arrangement, a cover door is provided that slides to the side to uncover the lens when the camera is to be operated. While this approach is convenient, it does not alleviate the problem of stray light entering the camera through a lens located in an exposed position at the front of the camera.

Other prior art cameras have used pivoting doors to cover the lens. For example a pair of doors have been mounted to pivot between closed and open positions. In the open position, the doors can extend forward from the lens and act as a hood on two opposed sides of the lens, typically on the top and bottom. However, this arrangement has not been entirely satisfactory because the remaining two sides of the lens are left unhooded. Light can enter the camera from the sides, or if the camera is turned ninety degrees to create a portrait style exposure rather than a landscape style exposure, the top of the lens is not shielded. Another disadvantage of using lens cover doors to shield the lens is that when the doors are open they have exposed sharp corners projecting in front of the camera, and are susceptible to damage.

SUMMARY OF THE INVENTION

A principal object of the present invention is to provide an improved camera lens cover and hood assembly wherein the cover and hood are simultaneously moved to an operating position when the camera is to be used and wherein a compact size is achieved when the cover is closed and the hood is retracted. Other objects of the invention are to provide a camera in which the hood can be tailored to the lens and block all light originating outside the field of view of the camera lens; to provide a lens cover and hood assembly wherein lens cover doors are mechanically coupled by a cam system to a lens hood for simultaneous movement between operating and standby positions; to provide an assembly in which lens doors in the open position are surrounded and protected by the lens hood in its extended position; to provide an assembly in which a single drive power source, such as a spring, moves a lens cover to an open position and simultaneously moves a lens hood to an extended position; and to provide a camera and a lens cover and hood assembly overcoming disadvantages of cameras, lens covers and lens hoods used in the past.

In brief, in accordance with the present invention there is provided a camera including a housing with a front surface. A lens is located near the front surface of the camera and a support is located adjacent the lens. At least one lens cover door is mounted on the support for movement between a closed position covering the lens and an open position spaced from the lens. A lens hood is mounted on the support for movement between a retracted position and an extended position in which the hood surrounds the axis of the lens and projects beyond the front surface of the camera. The camera includes a drive system for moving the door from the closed to the open position and for simultaneously moving the hood from the retracted to the extended position. The drive system includes cam and follower elements mechanically coupled between the door and the hood.

BRIEF DESCRIPTION OF THE DRAWING

The present invention together with the above and other objects and advantages may best be understood from the following detailed description of the preferred embodiment of the invention illustrated in the drawings, wherein:

FIG. 5 is a vertical section view taken along line 5—5 of FIG. 1 showing the lens hood in a retracted, standby position;

FIG. 6 is a view like FIG. 5 showing the lens hood in an intermediate position;

FIG. 7 is a view like FIG. 5 showing the lens hood in its extended open position;

FIG. 8 is a front elevational view of a lens block of the camera of FIG. 1 with the lens cover and lens hood omitted for clarity;

FIG. 9 is a sectional view taken along the line 9—9 of FIG. 8;

FIG. 10 is a sectional view taken along the line 10—10 of FIG. 8;

FIG. 11 is a sectional view taken along the line 11—11 of FIG. 8;

FIG. 12 is a front elevational view of the retractable lens hood and latch release system of the camera of FIG. 1;

FIG. 13 is a rear elevational view of the lens hood with the latch omitted;

FIG. 14 is a side elevational view taken along the line 14—14 of the lens hood of FIG. 13;

FIG. 15 is a sectional view taken along the line 15—15 of the lens hood of FIG. 13;

FIG. 16 is a front elevational view of the lens cover doors of the camera of FIG. 1;

FIG. 17 is a bottom elevational view of the lens cover doors of the camera of FIG. 1; and FIG. 18 side elevational view of the lens cover doors of the camera of FIG. 1.

DETAILED DESCRIPTION OF THE PREFERRED EMBODIMENTS

Figure 1:
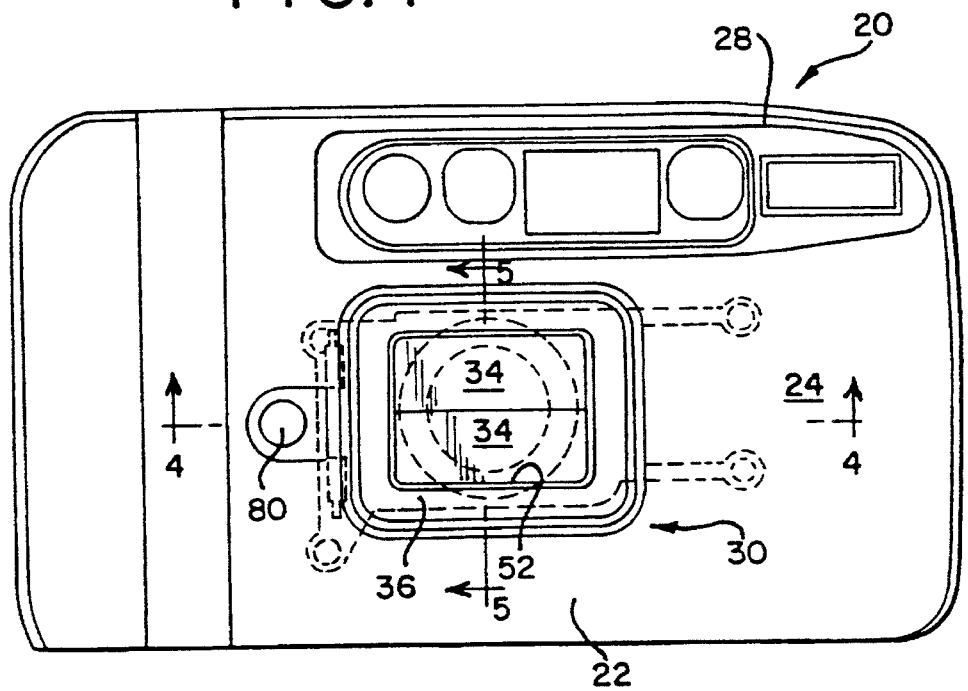
FIG. 1 is a front view of a camera having a lens cover and hood assembly constructed in accordance with the present invention.
Figure 2:
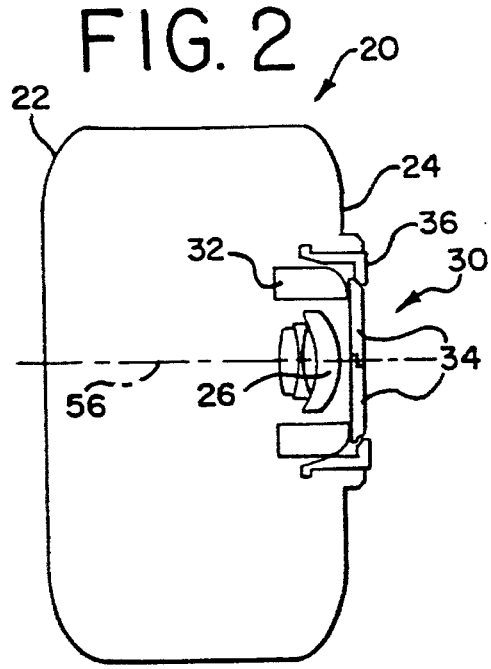
FIG. 2 is a diagrammatic vertical sectional view of the camera of FIG. 1 showing the camera in its standby condition.
Figure 3:
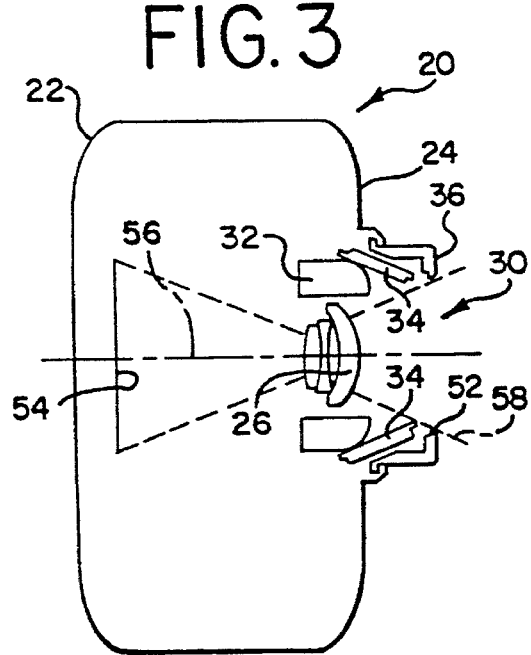
FIG. 3 is a view like FIG. 2 showing the camera in its operating condition.
Figure 4:
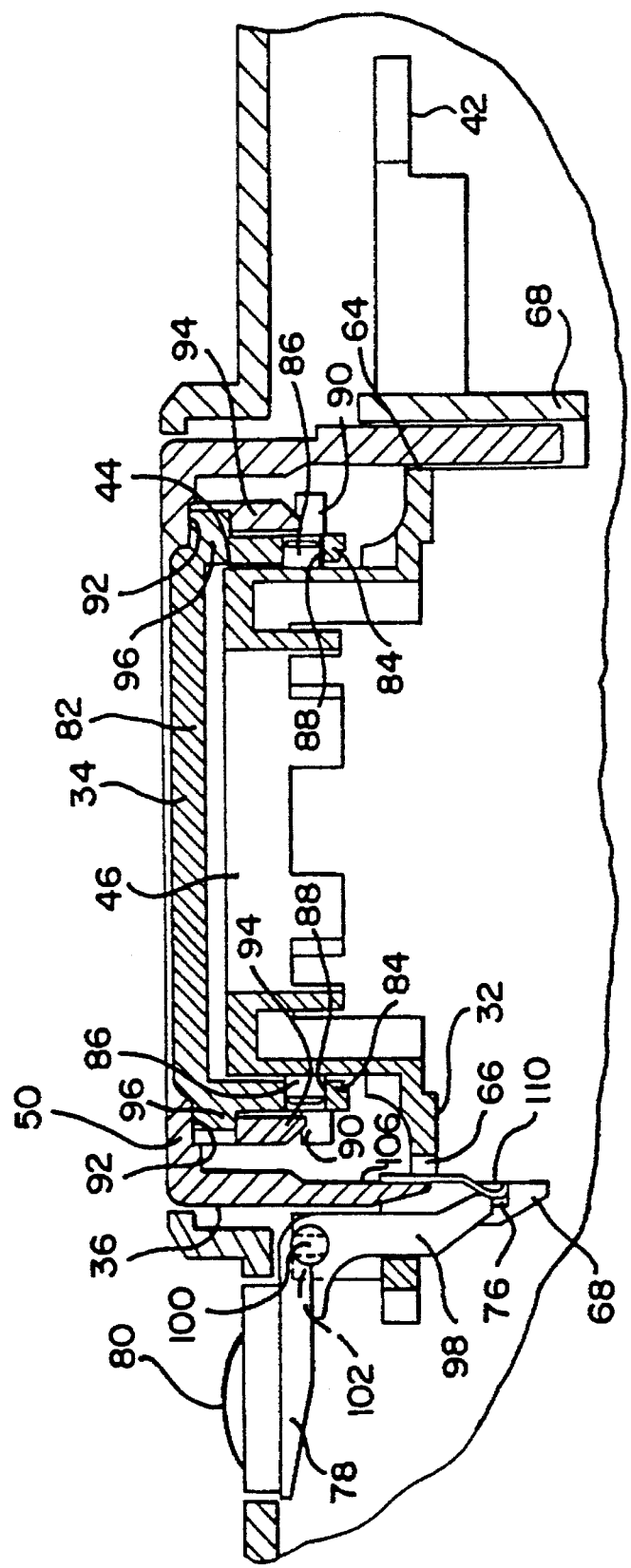
FIG. 4 is a horizontal sectional view taken along the line 4—4 of FIG. 1.

Having reference now to the drawings, and initially to FIGS. 1–3, there is illustrated a camera generally designated as 20. The camera 20 includes a housing 22 with a front wall surface 24. Camera 20 is of a compact size, with a small front to back thickness. A lens unit 26 is located near the front surface 24 of the housing 22. Except as described below, the camera 20 may be of any desired conventional construction and may include an array 28 of elements such as a flash, a view finder, a range finder, a sensor for remote operation or the like.

In accordance with the present invention the camera 20 is provided with a lens cover and hood assembly designated as a whole as 30. The assembly 30 is mounted near the lens 26 and is supported by a frame element 32 that may be part of or may be immediately behind the front housing surface 24. In addition to the frame element 32, the assembly 30 includes a pair of lens cover doors 34 and a lens hood 36. A cam system 38 causes the doors 34 and the hood 38 to move simultaneously between a standby position, in which the doors 34 are closed and the hood 36 is retracted, and an operating position, in which the doors 34 are open and the hood 36 is extended. A pair of springs 40 provide a single source of drive force for deploying the doors 34 and the hood 36 into the operating position.

In the specific embodiment of the invention illustrated in the drawings, the frame element 32 is preferably a one-piece molded plastic member with suitable mounting structure including a number of support legs 42 for securing the element 32 within the camera housing 22. A central barrel portion 44 of the frame element 32 defines a mounting opening 46 for the lens unit 26. Because of the compact size of the camera 20, when the lens 26 is mounted in the opening 46, it is very close to the front surface 24 of the camera 20. For this reason, it is desirable to protect the lens 26 form physical damage and dirt with the doors 34 when the camera is in its standby position and it is desirable to shield the lens 26 from light emanating from outside the field of view when the camera is in its operating condition.

The lens hood 36 includes a collar 48 with an inwardly turned lip 50 defining an aperture 52 through which light can travel to reach the lens 26. Preferably the aperture corresponds in shape to the generally rectangular film exposure area 54 (FIG. 3) of the camera 20. The hood 36 fully surrounds the lens axis 56 of the camera 20 and, as indicated by broken lines in FIG. 3, is shaped and positioned to block all light except that light which reaches the lens 26 from the field of view 58. Thus, with the hood 36 in its extended, operating position, flaring or veiling glare of the exposed film is avoided in any orientation of the camera 20.

In order to permit the lens hood 36 to move between a retracted, standby position and its extended, operating position, a pair of guide arms 60 and 62 extend rearwardly from the collar 48. The arms 60 and 62 are received respectively in openings 64 and 66 in the frame element 32 at opposite sides of the lens mounting opening 46. The arm 60 is slidably supported in a trackway defined by a C-shaped guide portion 68 of the element 32 aligned with the opening 64. The arm 62 is slidably supported in a trackway defined by a pair of rearwardly extending projections 70 and 72 of the element 32.

Arm 62 functions not only as a guide for the hood 36 but also as part of a latch system 74 for normally retaining the hood 36 in its retracted, standby position. For this purpose the arm 62 is provided with a latching structure 76. The opening 66 and the projections 68 and 70 are shaped to also receive a latch release member 78 including a release pushbutton 80 accessible to the user at the front surface 24 of the camera 20.

Each of the lens cover doors 34 includes a planar panel portion 82 and a pair of angled, rearwardly extending arms 84. The doors are mounted upon the frame element 32 for pivoting movement around a pair of spaced apart, horizontal pivot axes. The central barrel portion 44 of the frame element 32 includes four projecting hubs 86 and each arm 84 includes a mating opening 88. Each door 34 can pivot between a generally vertical, closed, standby position (FIG. 2) and a generally horizontal, open, operating position. When the doors 34 are closed, they abut one another to cover and protect the lens 26 without appreciably adding to the compact front to back thickness of the camera 20. When the doors 34 are open, they are located out of the field of view 58 (FIG. 3) and are nested in a protected position within the collar 48 of the lens hood 36.

Springs 40 continuously urge the doors 34 toward their open position. A finger 90 extends outwardly from the end of each of the arms 84. Springs 40 are coil springs stretched in tension between opposed pairs of fingers 90.

The cam system 38 causes the doors 34 to move in synchronism with the hood 36 in both directions between the standby and operating positions. A pair of opposed cam slots 92 are formed in a pair of internal walls 94 of the hood 36. Each of the arms 84 of the doors 34 includes a cam follower lug 96. In the standby position, lugs 96 are adjacent one another in the central region of the cam slots 92. In the operating position, the lugs 96 are located at the ends of the cam slots 92.

The latch system 74 normally holds the lens hood 36 in its retracted, standby position. Because the hood and lens cover doors 34 are mechanically coupled by the cam system 38, the doors 34 are also held in their closed, standby position by the latch system 74. When the latch system is operated to release the hood 36, the doors 34 are free to move, and they are pivoted to their open, operating positions by the tensioned coil springs 40. Simultaneously, the cam system 38 moves the hood 36 from its standby position to its extended, operating position. To return the camera 20 to the standby position, the user may push the hood inwardly to its retracted position. The cam system 38 simultaneously returns the doors 34 to their closed positions. During this movement, the tension in the springs 40 is increased. Preferably the latch system 74 is self latching when the doors 34 reach the closed, standby position.

The latch release member 78 is a lever including the pushbutton 80 and a latch release arm 98. Lever 78 includes opposed trunnions 100 pivotally received in pivot blocks 102. A latch spring 104 includes retention legs 106 captured in a maximum width portion 106 of the opening 66. A nose portion 110 of the spring 104 normally seats in recesses that comprise the latch structure 76 of the arm 62 to retain the hood 36 in its retracted position. Arm 62 is received in an intermediate width portion 112 of the opening 66. A narrow width portion 114 of opening 66 and a central slot 116 in arm 62 receive the latch release arm 98.

Normally the hood 36 and the doors 34 are held in their standby positions by engagement of the latch nose 110 with the latching structure 76 of arm 62. When the release pushbutton 80 is pressed, the lever 78 pivots and the arm 98 moves the nose 110 away from the recesses 76. This frees the hood 36 and doors 34 to move to the operating positions as a result of force provided by the springs 40. When the hood 36 is pushed to its retracted position, the nose 110 again enters the recesses 76 to latch the hood in its retracted position.

In the illustrated embodiment of the invention, the latch system 74 is manually released, the drive force for movement of the doors 34 and hood 36 to the operating position is provided by spring action and the doors 34 and hood 36 are manually returned to the standby position. Other alternatives are possible. A motor or other power source could be used to move the cover and hood in one or both directions. The cover or the hood or the release member 78 could be coupled to a power on off switch so that the camera is energized and deenergized in response to movement of the cover and hood to the operating and standby positions. The latch system could be operated automatically rather than manually.

While the present invention has been described with reference to the details of the embodiments of the invention shown in the drawing, these details are not intended to limit the scope of the invention as claimed in the appended claims.

What is claimed is:

1. A camera comprising:

housing means having a front surface;

a lens located near said front surface of the camera;

support means adjacent said lens;

a lens cover door mounted on said support means for movement between a closed position covering the lens and an open position spaced from said lens;

a lens hood mounted on the support means for movement between a retracted position and an extended position in which said hood surrounds the axis of the lens and projects beyond the front surface of the camera;

said camera being characterized by:

drive means for moving said door from said closed to said open position and for simultaneously moving said hood from said retracted to said extended position.

2. A camera as claimed in claim 1, comprising a pair of lens cover doors mounted for pivoting movement about a pair of spaced apart pivot axes.

3. A camera as claimed in claim 2, said pivot axes being horizontal in the normal orientation of the camera.

4. A camera as claimed in claim 1, said drive means including cam and follower means mechanically coupled between said door and said hood.

5. A camera as claimed in claim 4, said drive means further comprising a spring continuously urging said door toward said open position; and latch means for releasably holding said door in said closed position.

6. A camera as claimed in claim 5, said latch means comprising a latch member on said hood; and selectively operable latch release means for releasing said latch member.

7. A camera as claimed in claim 6, said latch release means comprising a manually movable button.

8. A camera as claimed in claim 4, comprising a pair of lens cover doors mounted for pivoting movement about a pair of spaced apart pivot axes;

said drive means comprising spring means biasing said doors toward said open positions; and latch means for releasably holding said hood in said retracted position;

said cam means holding said doors in said closed position when said hood is in said retracted position.

9. A camera as claimed in claim 8, further comprising a latch release means for selectively freeing said hood.

10. A camera as claimed in claim 9, said catch being self latching in response to movement of said hood from said extended position to said retracted position.

11. A camera as claimed in claim 2, said doors being located within said hood when said hood is in said extended position and said doors are in said open position.

* * * * *